(12) United States Patent
Noda et al.

(10) Patent No.: US 12,138,598 B2
(45) Date of Patent: Nov. 12, 2024

(54) DEHYDRATION METHOD AND DEHYDRATION APPARATUS PROVIDING INCREASED WATER PERMEATION

(71) Applicant: NGK INSULATORS, LTD., Nagoya (JP)

(72) Inventors: Kenichi Noda, Nagoya (JP); Makoto Miyahara, Nagoya (JP); Katsuya Shimizu, Nagoya (JP); Takeshi Hagio, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 446 days.

(21) Appl. No.: 16/704,091

(22) Filed: Dec. 5, 2019

(65) Prior Publication Data

US 2020/0122096 A1 Apr. 23, 2020

Related U.S. Application Data

(63) Continuation of application No. PCT/JP2018/021703, filed on Jun. 6, 2018.

(30) Foreign Application Priority Data

Jun. 7, 2017 (JP) ................. 2017-112635

(51) Int. Cl.
*B01D 71/02* (2006.01)
*B01D 61/36* (2006.01)
(Continued)

(52) U.S. Cl.
CPC ....... *B01D 71/0281* (2022.08); *B01D 61/362* (2013.01); *C02F 1/448* (2013.01); *C02F 2101/30* (2013.01)

(58) Field of Classification Search
CPC ............ B01D 61/362; B01D 63/066; B01D 67/0051; B01D 69/12; B01D 71/028;
(Continued)

(56) References Cited

U.S. PATENT DOCUMENTS 10,625,215 B2 * 4/2020 Noda .................. B05D 1/36
2007/0214959 A1 * 9/2007 Le Bec ................ B01D 53/02
502/62

(Continued)

FOREIGN PATENT DOCUMENTS

JP 2006150239 A * 6/2006
JP 2009-539592 A1 11/2009
(Continued)

OTHER PUBLICATIONS

English translation of International Preliminary Report on Patentability (Application No. PCT/JP2018/021703) dated Dec. 10, 2019.
(Continued)

*Primary Examiner* — Hayden Brewster
(74) *Attorney, Agent, or Firm* — BURR PATENT LAW, PLLC

(57) ABSTRACT

A dehydration method is a dehydration method for selectively separating water from a mixture that contains water, and the method includes a step of supplying the mixture to a supply side space of a separation membrane, and a step of making a pressure difference between the supply side space and a permeation side space of the separation membrane. The separation membrane includes a first zeolite membrane that faces the permeation side space and is constituted by a first zeolite and a second zeolite membrane that faces the supply side space and is adjacent to the first zeolite membrane. The second zeolite membrane is constituted by a second zeolite that has the same framework structure as
(Continued)

framework of the first zeolite and has a lower Si/Al atom ratio than a Si/Al atom ratio of the first zeolite.

6 Claims, 6 Drawing Sheets

(51) Int. Cl.
*C02F 1/44* (2023.01)
*C02F 101/30* (2006.01)

(58) Field of Classification Search
CPC ......... C01B 39/04; C01B 39/36; C02F 1/448; C02F 2101/30
USPC ........................................................ 210/640
See application file for complete search history.

(56) References Cited

U.S. PATENT DOCUMENTS

| | | |
|---|---|---|
| 2009/0007780 A1 | 1/2009 | Yajima et al. |
| 2009/0200236 A1 | 8/2009 | Diefenbacher et al. |
| 2012/0074065 A1* | 3/2012 | Satou ................ B01D 67/0051 210/500.25 |
| 2014/0291245 A1* | 10/2014 | Inukai .................. B01D 71/028 210/651 |
| 2014/0331860 A1 | 11/2014 | Isomura et al. |
| 2016/0016125 A1* | 1/2016 | Uchikawa .......... B01D 67/0088 210/488 |
| 2017/0225130 A1 | 8/2017 | Noda et al. |

FOREIGN PATENT DOCUMENTS

| | | | |
|---|---|---|---|
| JP | 2012-067091 A1 | 4/2012 | |
| JP | 2012-081463 A1 | 4/2012 | |
| JP | 2013126649 A * | 6/2013 | |
| JP | 2016-041417 A1 | 3/2016 | |
| WO | 2007/119286 A1 | 10/2007 | |
| WO | 2013/129625 A1 | 9/2013 | |
| WO | WO-2016006564 A1 * | 1/2016 | ............. B01D 53/22 |
| WO | 2016/084846 A1 | 6/2016 | |
| WO | WO-2016084679 A1 * | 6/2016 | ......... B01D 67/0046 |

OTHER PUBLICATIONS

International Search Report and Written Opinion (Application No. PCT/JP2018/021703) dated Aug. 7, 2018.

* cited by examiner

DEHYDRATION METHOD AND DEHYDRATION APPARATUS PROVIDING INCREASED WATER PERMEATION

TECHNICAL FIELD

The present invention relates to a dehydration method and a dehydration apparatus.

BACKGROUND ART

As a conventional method for separating water from (dehydrating) a mixture that contains water, a dehydration method is proposed in which a DDR-type zeolite membrane that has excellent acid resistance is used as a separation membrane (see WO 2007/119286).

SUMMARY

There are demands for further increasing the water permeation amount of a separation membrane.

The present invention was made in view of the above circumstances, and an object of the present invention is to provide a dehydration method and a dehydration apparatus that can increase the water permeation amount.

A dehydration method according to the present invention is a dehydration method for selectively separating water from a mixture that contains water, and the method includes a step of supplying the mixture to a supply side space of a separation membrane, and a step of making a pressure difference between the supply side space and a permeation side space of the separation membrane. The separation membrane includes a first zeolite membrane that faces the permeation side space and is constituted by a first zeolite and a second zeolite membrane that faces the supply side space and is adjacent to the first zeolite membrane. The second zeolite membrane is constituted by a second zeolite that has the same framework structure as framework of the first zeolite and has a lower Si/Al atom ratio than a Si/Al atom ratio of the first zeolite.

According to the present invention, a dehydration method and a dehydration apparatus that can increase the water permeation amount can be provided.

DESCRIPTION OF EMBODIMENTS

Dehydration Apparatus

The following describes, with reference to the drawings, one example of a dehydration apparatus that is used for carrying out a dehydration method for selectively separating water from a mixture containing water. In the present specification, "dehydration" means selectively separating water.

"Selectively separating water" includes not only separating and taking out water of 100% purity from a mixture, but also separating and taking out a solution or gas that has a higher water content than that of the mixture.

Figure 1:
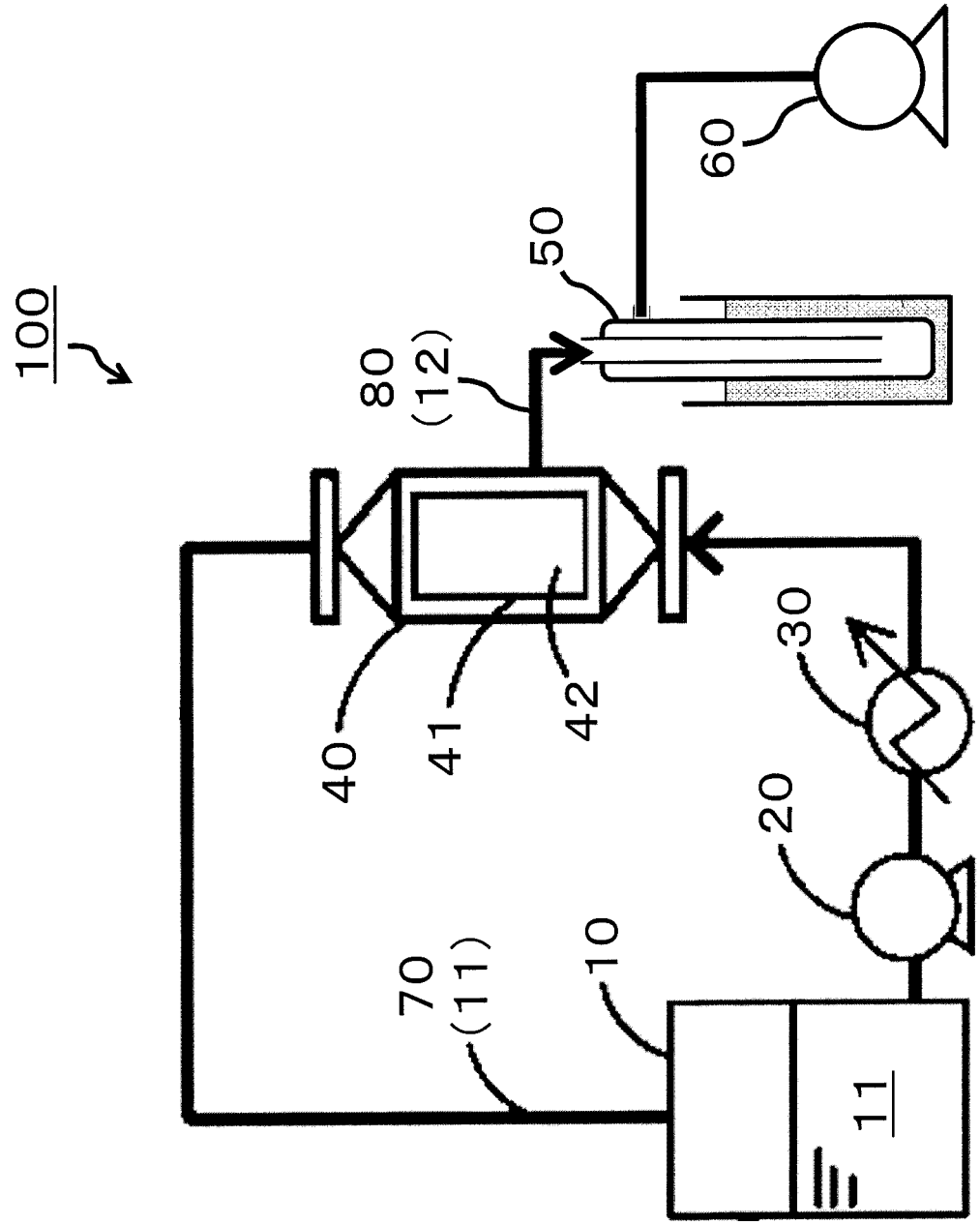
FIG. 1 is a schematic diagram showing the configuration of a dehydration apparatus.

FIG. 1 is a schematic diagram showing the entire configuration of a dehydration apparatus 100 according to the present embodiment.

The dehydration apparatus 100 includes an accommodation portion 10, a circulation pump 20, a heater 30, a separation vessel 40, a trapping portion 50, a pressure reducing apparatus 60, a circulation path 70, and a permeation path 80. The accommodation portion 10, the circulation pump 20, the heater 30, and the separation vessel 40 are arranged on the circulation path 70. The trapping portion 50 and the pressure reducing apparatus 60 are arranged on the permeation path 80.

The accommodation portion 10 accommodates a mixture 11 to be processed. The mixture 11 is circulated through the circulation path 70 to the accommodation portion 10. The mixture 11 contains water and components other than water.

The mixture 11 may contain water and organic compounds. Examples of organic compounds include alcohols, phenols, aldehydes, ketones, carboxylic acids, sulfonic acids, ethers, esters, amines, nitriles, straight-chain saturated hydrocarbons, branched saturated hydrocarbons, cyclic saturated hydrocarbons, chain unsaturated hydrocarbons, aromatic hydrocarbons, nitrogen-containing compounds, sulfur-containing compounds, and halogen derivatives of hydrocarbons. Examples of alcohols include methanol, ethanol, isopropanol, ethylene glycol, and butanol. Examples of ketones include acetone and ethyl methyl ketone. Examples of carboxylic acids include formic acid, acetic acid, butyric acid, propionic acid, oxalic acid, acrylic acid, and benzoic acid. Examples of aromatic hydrocarbons include toluene and benzene. The mixture 11 may contain only one component other than water or contain two or more components other than water.

The circulation pump 20 circulates the mixture 11 through the circulation path 70 by discharging the mixture 11 to the separation vessel 40 side. It is preferable that the supply fluid velocity of the mixture 11 supplied to the separation vessel 40 is 1.5 m/s or more and 3.0 m/s or less in cells 43, which will be described later. Alternatively, it is preferable that the Reynolds number caused by the supply fluid velocity of the mixture 11 supplied to the separation vessel 40 is 2000 or more and 10000 or less.

The heater 30 heats the mixture 11 circulated through the circulation path 70 to a temperature that is suitable for dehydration performed in the separation vessel 40. The temperature of the mixture 11 supplied to the separation vessel 40 is preferably from 50° C. to 130° C., and more preferably from 55° C. to 110° C., in order to efficiently perform a dehydration process.

The separation vessel 40 includes a housing portion 41 and a membrane structure 42. The housing portion 41 accommodates the membrane structure 42. The material of the housing portion 41 is not particularly limited, and can be determined as appropriate in accordance with characteristics of the mixture 11, for example. If the mixture 11 contains acid, for example, the housing portion 41 can be made of glass, stainless steel, or the like.

The interior space of the housing portion 41 is sectioned into a supply side space 4S and a permeation side space 4T by a separation membrane 45 of the membrane structure 42, which will be described later (see FIG. 2). That is, the separation membrane 45 of the membrane structure 42 separates the supply side space 4S and the permeation side space 4T from each other. The mixture 11 is supplied to the supply side space 4S. Out of the components of the mixture 11, a membrane-permeating substance 12 permeated through the separation membrane 45 of the membrane structure 42 flows into the permeation side space 4T. The membrane-permeating substance 12 is water or a solution or gas in which water is concentrated. The configuration of the membrane structure 42 will be described later.

Note that pressure sensors (not shown) are connected to the separation vessel 40, and the pressure in the supply side space 4S and the pressure in the permeation side space 4T can be detected by the pressure sensors.

The trapping portion 50 is connected to the separation vessel 40 via the permeation path 80. When a dehydration process is carried out, the inside pressure of the trapping portion 50 can be reduced, and further, the pressure in the permeation side space 4T of the housing portion 41 can be reduced to a predetermined pressure, as a result of the pressure reducing apparatus 60 operating.

The trapping portion 50 is made of a material that can withstand pressure applied during a pressure reducing operation. The trapping portion 50 can be made of glass, stainless steel, or the like, for example.

A refrigerant may be used in the trapping portion 50 in order to cool and trap vapor of the membrane-permeating substance 12 flowing into the trapping portion 50. The refrigerant can be selected as appropriate depending on the type of the membrane-permeating substance 12 and the inside pressure of the trapping portion 50. Examples of refrigerants that can be used include liquid nitrogen, ice water, water, antifreeze liquid, dry ice (solid carbon dioxide), a combination of dry ice and ethanol (or acetone or methanol), and liquid argon.

However, the trapping portion 50 is not limited to the structure shown in FIG. 1, and is only required to be capable of trapping the membrane-permeating substance 12 while the pressure in the permeation side space 4T of the housing portion 41 is reduced to a predetermined pressure.

The pressure reducing apparatus 60 is one example of a "pressure changing apparatus" for making a pressure difference between the supply side space 4S and the permeation side space 4T. In the present embodiment, the pressure reducing apparatus 60 reduces the pressure in the permeation side space 4T to a predetermined pressure or a lower pressure. "Reducing the pressure" includes reducing partial pressure of the membrane-permeating substance 12 in the permeation side space 4T. A well-known vacuum pump can be used as the pressure reducing apparatus 60, for example.

Note that a pressure controller for adjusting the pressure in the permeation side space 4T may also be provided on the permeation path 80.

Membrane Structure

Figure 2:
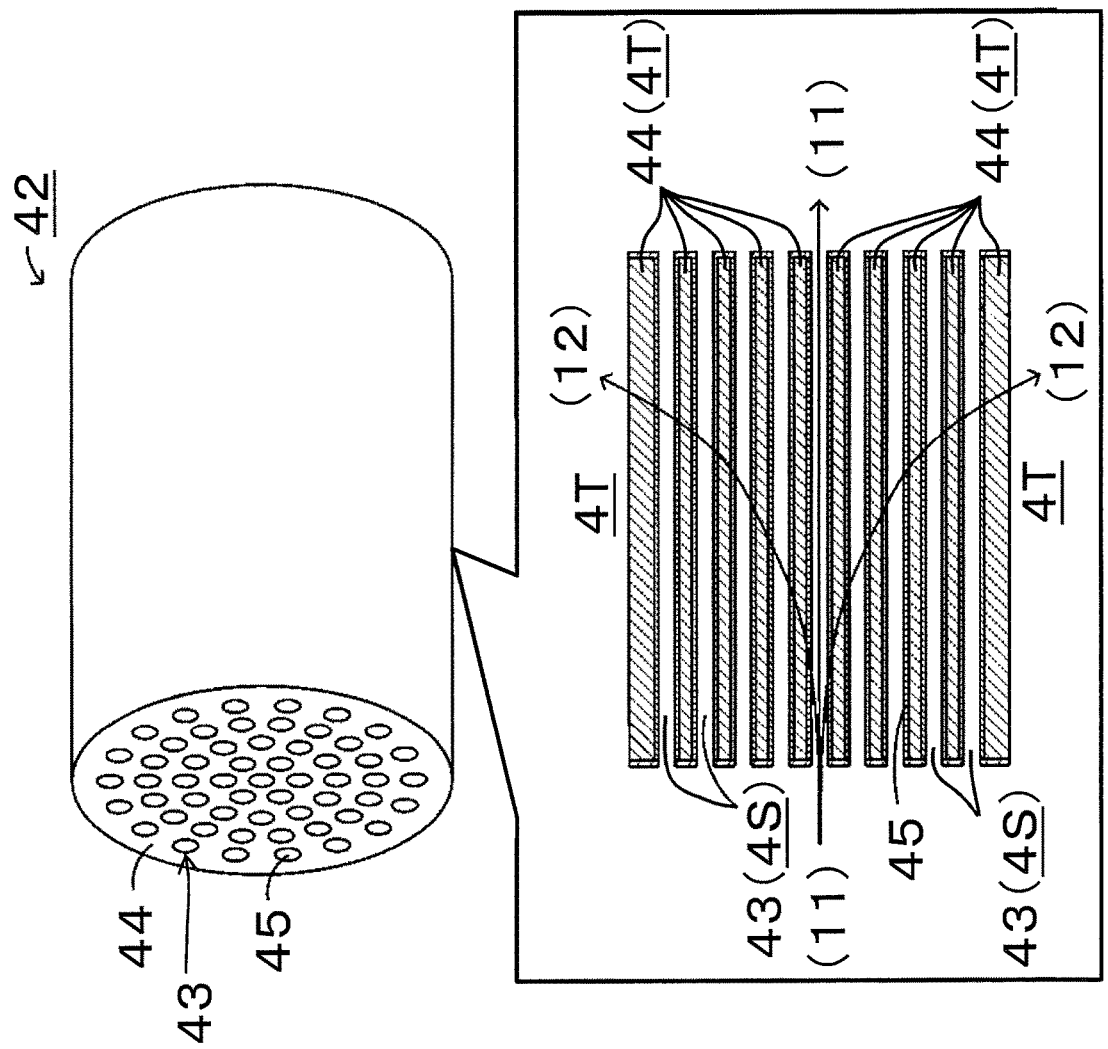
FIG. 2 is a cross-sectional view of a membrane structure.
Figure 3:
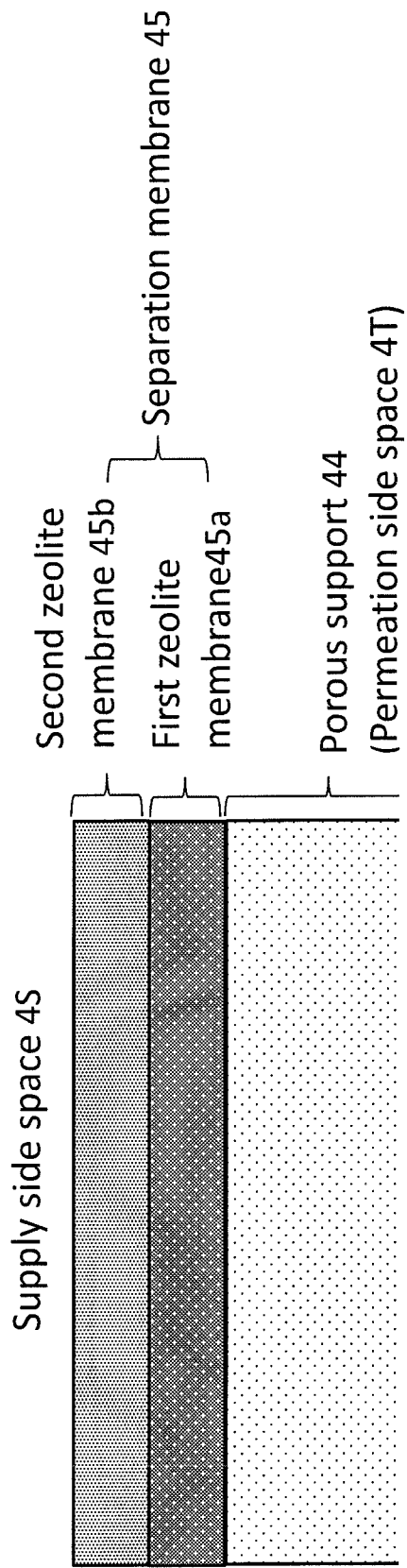
FIG. 3 is a cross-sectional view of a separation membrane.

FIG. 2 is a cross-sectional view of the membrane structure 42. FIG. 3 is an enlarged cross-sectional view of the separation membrane 45 shown in FIG. 2.

The membrane structure 42 includes a porous support 44 and the separation membrane 45.

1. Porous Support 44

The porous support 44 supports the separation membrane 45. The porous support 44 has chemical stability to an extent that the separation membrane 45 can be formed (crystallized, applied, or deposited) on a surface of the porous support 44 in the form of a membrane.

The porous support 44 is a ceramic sintered body. Alumina, silica, mullite, zirconia, titania, yttria, silicon nitride, silicon carbide, ceramic sand, cordierite, and the like can be used as the aggregate of the porous support 44. The porous support 44 may contain a binding material. A glass material containing silicon (Si), aluminum (Al), titanium (Ti), and the like can be used as the binding material. The content of the binding material may be set to be 20 vol % or more and 40 vol % or less, but is not limited thereto.

In the present embodiment, the porous support 44 has a monolith-shape. A monolith-shape refers to a shape having a plurality of cells 43 provided in the longitudinal direction, and includes a honeycomb shape. However, the porous support 44 is only required to have a shape with which the mixture 11 to be processed can be supplied to the separation membrane 45. For example, the porous support 44 may have a flat plate-like shape, a tubular shape, a cylindrical shape, a columnar shape, or a prismatic column-like shape. Surface roughness (Ra) of the porous support 44 is preferably 0.1 μm to 2.0 μm, and more preferably 0.2 μm to 1.0 μm. Ra of the porous support 44 can be measured using a stylus surface roughness measurement device.

If the porous support 44 has a monolith-shape, the length thereof in the longitudinal direction can be set to 100 to 2000 mm, and the diameter thereof in the radial direction can be set to 5 to 300 mm, but there is no limitation thereon. If the porous support 44 has a monolith-shape, it is possible to form 30 to 2500 cells 43 having a diameter of 1 to 5 mm in the porous support 44. The distance between central axes of adjacent cells 43 can be set to 0.3 mm to 10 mm, for example. If the porous support 44 has a tubular shape, the thickness of the porous support 44 can be set to 0.1 mm to 10 mm, for example.

The porous support 44 is a porous body having multiple open pores. An average pore size of the porous support 44 need only be a size at which the membrane-permeating substance 12 (mainly water) in the fluid mixture that has permeated through the separation membrane 45 can pass through pores. The permeation amount of the membrane-permeating substance 12 can be increased by increasing the average pore size of the porous support 44. The strength of the porous support 44 can be increased by reducing the average pore size of the porous support 44. The average pore size of the porous support 44 can be 0.01 μm or more and 5 μm or less, for example. The average pore size of the porous support 44 can be measured, depending on the size of pores, using a mercury intrusion method, an air-flow method described in ASTM F316, or perm porometry. The porosity of the porous support 44 is not particularly limited, and can be 25% to 50%, for example. With regard to a cumulative volume distribution of the pore size of the porous support 44, D5 can be 0.1 μm to 50 μm, for example, D50 can be 0.5 μm to 70 μm, for example, and D95 can be 10 μm to 2000 μm, for example.

An average particle size of the porous support 44 is not particularly limited, and can be 0.1 μm or more and 100 μm or less, for example. The average particle size of the porous support 44 refers to an arithmetic average value of the maximum diameters of 30 particles that are measured through cross-sectional observation using a SEM (Scanning Electron Microscope). 30 particles to be measured need only be selected in a SEM image at random.

The porous support 44 may have a monolayer structure in which pores have a uniform size, or a multilayer structure in which pores have different sizes. If the porous support 44 has a multilayer structure, it is preferable that the closer a layer is to the separation membrane 45, the smaller the average pore size is. If the porous support 44 has a multilayer structure, the average pore size of the porous support 44 refers to an average pore size of an outermost layer that is in contact with the separation membrane 45. If the porous support 44 has a multilayer structure, each layer can be constituted by at least one selected from the above-described materials, and materials constituting layers may be different from each other.

2. Separation Membrane 45

The separation membrane 45 is formed on an inner surface of the porous support 44. The separation membrane 45 is formed into a tubular shape. The space inside the separation membrane 45 is the supply side space 4S and the space outside the separation membrane 45 (i.e., the porous support 44 side space) is the permeation side space 4T. In the present embodiment, the supply side space 4S is a cell 43. The permeation side space 4T includes not only the exterior space of the porous support 44 but also the interior space of the porous support 44.

Thus, one surface of the separation membrane 45 faces the supply side space 4S and the other surface of the separation membrane 45 faces the permeation side space 4T. When the mixture 11 is supplied to the supply side space 4S, the mixture 11 comes into contact with the one surface of the separation membrane 45. When the pressure in the permeation side space 4T is reduced in this state, the membrane-permeating substance 12 contained in the mixture 11 permeates through the separation membrane 45. The membrane-permeating substance 12 is water or a solution or gas in which water is concentrated. As described above, the membrane-permeating substance 12 permeated through the separation membrane 45 is sucked by the pressure reducing apparatus 60 and is trapped in the trapping portion 50.

The separation membrane 45 includes a first zeolite membrane 45a that is formed on the porous support 44 and a second zeolite membrane 45b that is adjacent to the first zeolite membrane 45a. A first zeolite that constitutes the first zeolite membrane 45a and a second zeolite that constitutes the second zeolite membrane 45b have the same framework structure. The second zeolite has a lower Si/Al atom ratio than that of the first zeolite.

The framework structure of a zeolite refers to a structure that is expressed by an IUPAC structure code defined by the Structure Commission of the International Zeolite Association. The framework structure of the first zeolite and the second zeolite is not particularly limited, but preferable structures are MFI, DDR, MEL, BEA, and CHA, which have high chemical stability, and particularly preferable structures are MFI and MEL, which have, as pores having the largest pore size, pores constituted by oxygen 10-membered rings that facilitate an increase in the water permeation amount while maintaining dehydration performance.

An oxygen 10-membered ring is also simply referred to as a "10-membered ring", and is a portion in which the number of oxygen atoms constituting the pore framework is ten, and oxygen atoms are linked to a Si atom, an Al atom, and the like to form a ring structure. Note that the oxygen 10-membered rings include those forming through holes (channels), and do not include those not forming through holes.

In the first zeolite and the second zeolite, at least a portion of silicon (Si) and aluminum (Al), which are atoms (T atoms) located at centers of oxygen tetrahedrons ($TO_4$) constituting the zeolites, may be substituted by another element.

The first zeolite membrane 45a and the second zeolite membrane 45b can be formed using a well-known hydrothermal synthesis method.

The following describes a case in which the framework structure of zeolites constituting the separation membrane 45 is an MFI structure, but the framework structure is not limited to this structure.

A zeolite having an MFI structure has, as pores constituted by oxygen 10-membered rings, pores that have a major axis of 0.56 nm and a minor axis of 0.53 nm and pores that have a major axis of 0.55 nm and a minor axis of 0.51 nm.

In the following description, the first zeolite membrane 45a having an MFI structure will be abbreviated as a "first MFI zeolite membrane 45a", and the second zeolite membrane 45b having an MFI structure will be abbreviated as a "second MFI zeolite membrane 45b". Also, the first zeolite having an MFI structure and constituting the first MFI zeolite membrane 45a will be abbreviated as a "first MFI zeolite", and the second zeolite having an MFI structure and constituting the second MFI zeolite membrane 45b will be abbreviated as a "second MFI zeolite".

Figure 4:
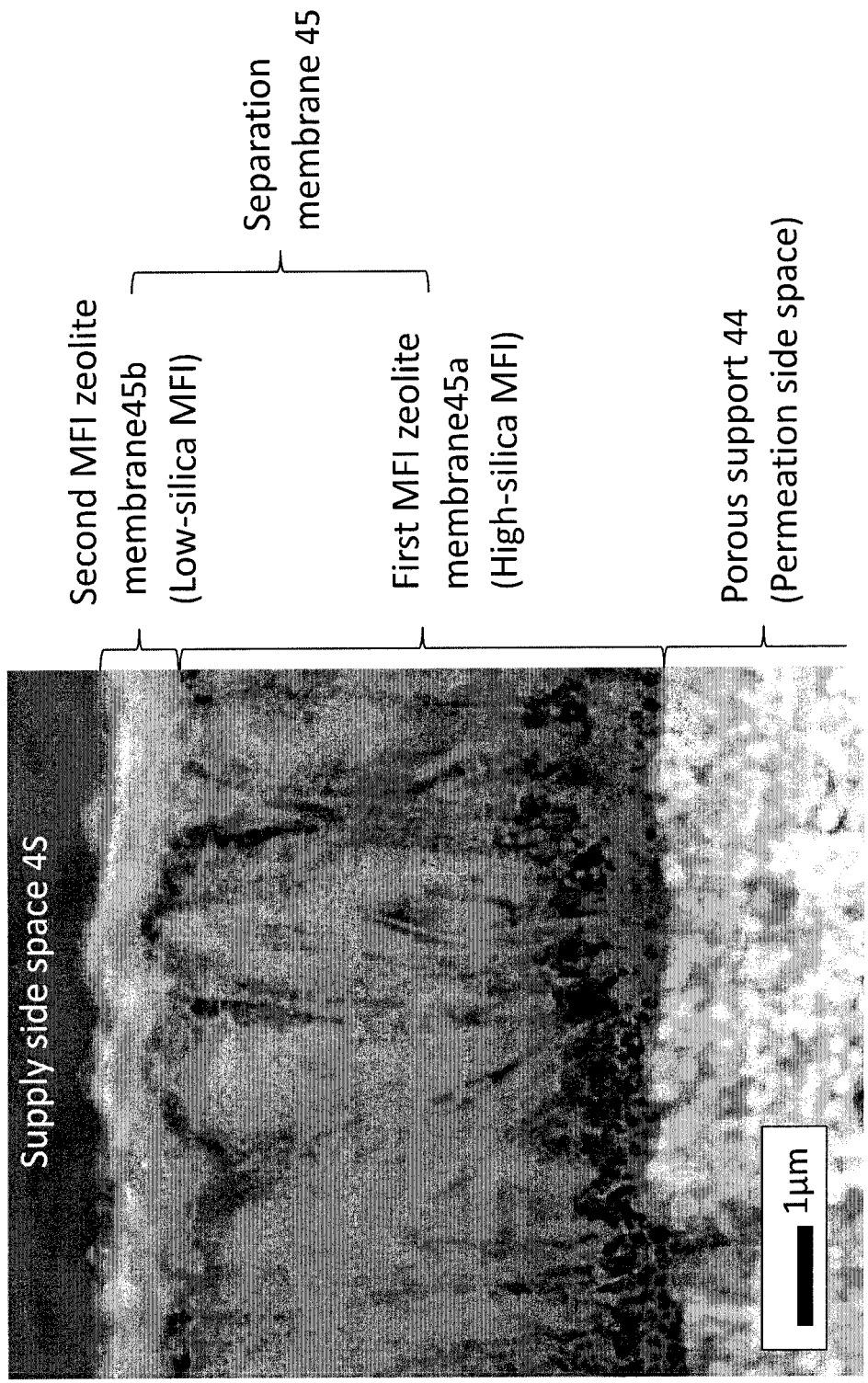
FIG. 4 is a SEM image showing a cross section of a separation membrane.

FIG. 4 is a SEM (scanning electron microscope) image showing a cross section of the separation membrane 45.

The first MFI zeolite membrane 45a faces the permeation side space 4T. The first MFI zeolite membrane 45a is formed on a surface of the porous support 44. If the porous support 44 has a honeycomb shape, the first MFI zeolite membrane 45a is formed on an inner surface of the porous support 44.

The first MFI zeolite membrane 45a is constituted by the first MFI zeolite. The Si/Al atom ratio of the first MFI zeolite is not particularly limited, and can be set to 1.5 or higher, for example, and is preferably 200 or higher. A zeolite that has a Si/Al atom ratio of 200 or higher is a high-silica zeolite. Accordingly, a first MFI zeolite membrane 45a that is constituted by a high-silica zeolite substantially does not contain aluminum, and is formed by silicon atoms and oxygen atoms.

The first MFI zeolite has a higher Si/Al atom ratio than that of the second MFI zeolite, and accordingly the first MFI zeolite membrane 45a is more hydrophobic than the second MFI zeolite membrane 45b. Therefore, the membrane-permeating substance 12 permeated through the second MFI zeolite membrane 45b can rapidly permeate through the first MFI zeolite membrane 45a to the porous support 44 side. This increases the water permeation amount of the separation membrane 45, in combination with an effect owing to hydrophilicity of the second MFI zeolite membrane 45b, which will be described later. In particular, if the first MFI zeolite membrane 45a is constituted by a high-silica zeolite, this effect of increasing the water permeation amount can be further increased.

Also, if the first MFI zeolite membrane 45a is constituted by a high-silica zeolite, a surface of the first MFI zeolite membrane 45a can be sufficiently activated, and therefore adhesion between the first MFI zeolite membrane 45a and the second MFI zeolite membrane 45b can be improved in formation of the second MFI zeolite membrane 45b.

Furthermore, if the first MFI zeolite membrane 45a is constituted by a high-silica zeolite, corrosion resistance of the first MFI zeolite membrane 45a can be improved and the occurrence of a membrane defect can be reduced.

Note that the Si/Al atom ratio of the first MFI zeolite can be adjusted by controlling the composition of a starting material solution that is used in hydrothermal synthesis. The Si/Al atom ratio of the first MFI zeolite can be measured using scanning electron microscope-energy dispersive X-ray spectroscopy (SEM-EDX).

The first MFI zeolite membrane 45a may also contain an inorganic binder, such as silica or alumina, an organic binder, such as a polymer, a silylation agent, or the like, in addition to the zeolite.

The first MFI zeolite membrane 45a is formed in the form of a membrane. The thickness of the first MFI zeolite membrane 45a is not particularly limited, and can be set to 0.1 μm to 10 μm, for example. The water permeation amount can be further increased by reducing the thickness of the first MFI zeolite membrane 45a, and selectivity and membrane strength can be improved by increasing the thickness of the first MFI zeolite membrane 45a. The thickness of the first MFI zeolite membrane 45a can be adjusted by controlling the length of hydrothermal synthesis time and the synthesis temperature. Surface roughness (Ra) of the first MFI zeolite membrane 45a is preferably 5 μm or less, and more preferably 2 μm or less. Ra of the first MFI zeolite membrane 45a is measured by using a confocal laser microscope that can be used for three-dimensional measurement, obtaining values of Ra in 10 randomly selected fields of vision of 100 μm square by correcting waviness of the porous support 44, and taking the smallest value of the thus obtained values as the value of Ra.

The second MFI zeolite membrane 45b faces the supply side space 4S. The second MFI zeolite membrane 45b is in direct contact with a surface of the first MFI zeolite membrane 45a. In the present embodiment, the second MFI zeolite membrane 45b is formed on the surface of the first MFI zeolite membrane 45a.

The second MFI zeolite membrane 45b is constituted by the second MFI zeolite that has a lower Si/Al atom ratio than that of the first MFI zeolite. The Si/Al atom ratio of the second MFI zeolite is not particularly limited, and can be set to lower than 200, for example, and is preferably 60 or lower. A zeolite that has a Si/Al atom ratio of 60 or lower is a low-silica zeolite. Accordingly, a second MFI zeolite membrane 45b that is constituted by a low-silica zeolite is substantially formed by silicon atoms, aluminum atoms, oxygen atoms, and at least one type of atom selected from the group consisting of alkali metals, such as sodium (Na), alkaline earth metals, such as magnesium (Mg), and hydrogen (H).

The second MFI zeolite has a lower Si/Al atom ratio than that of the first MFI zeolite, and accordingly the second MFI zeolite membrane 45b is more hydrophilic than the first MFI zeolite membrane 45a. Therefore, water contained in the mixture 11 can adsorb to the second MFI zeolite membrane 45b and can be selectively and efficiently caused to permeate through the second MFI zeolite membrane 45b to the first MFI zeolite membrane 45a side. This increases the water permeation amount of the separation membrane 45, in combination with the above-described effect owing to hydrophobicity of the first MFI zeolite membrane 45a. In particular, if the second MFI zeolite membrane 45b is constituted by a low-silica zeolite, this effect of increasing the water permeation amount can be further increased.

The second MFI zeolite has the same framework structure as that of the first MFI zeolite, and accordingly composite building units are common between the second MFI zeolite and the first MFI zeolite. This improves adhesion between the first MFI zeolite membrane 45a and the second MFI zeolite membrane 45b, membrane formability of the second MFI zeolite membrane 45b, and separation performance of the first and second MFI zeolite membranes 45a, 45b.

A composite building unit of a zeolite refers to a unit structure that constitutes the framework structure of the zeolite. Details of composite building units of zeolites are disclosed in the International Zeolite Association (IZA) "Database of Zeolite Structures" [online], [searched on Feb. 28, 2017], <URL:http://www.iza-structure.org/databases/>.

Note that the Si/Al atom ratio of the second MFI zeolite can be adjusted by controlling the composition of a starting material solution that is used in hydrothermal synthesis. The Si/Al atom ratio of the second MFI zeolite can be measured using SEM-EDX.

The second MFI zeolite membrane 45b is formed in the form of a membrane. The thickness of the second MFI zeolite membrane 45b is not particularly limited, and can be set to 0.1 μm to 3.0 μm, for example. The water permeation amount can be further increased by reducing the thickness of the second MFI zeolite membrane 45b, and selectivity and membrane strength can be improved by increasing the thickness of the second MFI zeolite membrane 45b. The thickness of the second MFI zeolite membrane 45b can be adjusted by controlling the length of hydrothermal synthesis time and the synthesis temperature. It is preferable that the second MFI zeolite membrane 45b is thinner than the first MFI zeolite membrane 45a, in terms of further increasing the water permeation amount. Surface roughness (Ra) of the second MFI zeolite membrane 45b is preferably 5 μm or less, and more preferably 2 μm or less. Ra of the second MFI zeolite membrane 45b is measured by using a confocal laser microscope that can be used for three-dimensional measurement, obtaining values of Ra in 10 randomly selected fields of vision of 100 μm square by correcting waviness of the porous support 44, and taking the smallest value of the thus obtained values as the value of Ra.

Method for Manufacturing Porous Support 44 and Separation Membrane

1. Production of Porous Support 44

A compact is formed by molding a ceramic material into a desired shape using an extrusion molding method, a press molding method, a cast molding method, or the like.

Then, the porous support 44 is formed by firing (900° C. to 1450° C., for example) the compact. The porous support 44 may have an average pore size of 0.01 μm or more and 5 μm or less.

In production of a porous support 44 that has a multilayer structure, a slurry that contains a ceramic material is applied to a surface of a fired compact through filtration or the like, and thereafter the compact is fired.

2. Formation of First MFI Zeolite Membrane 45a

Next, the first MFI zeolite membrane 45a constituted by the first MFI zeolite is formed on a surface of the porous support 44. The first MFI zeolite membrane 45a can be formed using a well-known hydrothermal synthesis method.

The first MFI zeolite membrane 45a may be formed using zeolite seed crystals, or without using zeolite seed crystals. The Si/Al atom ratio of the first MFI zeolite can be adjusted to 200 or higher, for example, by controlling the composition of a starting material solution (including a Si source, an Al source, an organic structure-directing agent, and water, for example) that is used in hydrothermal synthesis. Colloidal silica, fumed silica, tetraethoxysilane, sodium silicate, or the like can be used as a Si source, for example. Aluminum isopropoxide, aluminum hydroxide, sodium aluminate, alumina sol, or the like can be used as an Al source, for example. Tetrapropylammonium hydroxide, tetrapropylammonium bromide, tetrapropylammonium chloride, or the like can be used as an organic structure-directing agent, for example.

An organic structure-directing agent contained in the first MFI zeolite may be burned off after formation of the first MFI zeolite membrane 45a or after formation of the second MFI zeolite membrane 45b. It is more preferable to burn off the organic structure-directing agent after formation of the first MFI zeolite membrane 45a because, in such a case, if a defect is generated in the first MFI zeolite membrane 45a as a result of the organic structure-directing agent being removed, the defect is covered by the second MFI zeolite membrane 45b.

3. Formation of Second MFI Zeolite Membrane 45b

Next, the second MFI zeolite membrane 45b constituted by the second MFI zeolite is formed on a surface of the first MFI zeolite membrane 45a. The second MFI zeolite membrane 45b can be formed using a well-known hydrothermal synthesis method.

The second MFI zeolite membrane 45b may be formed using zeolite seed crystals, or without using zeolite seed crystals. The Si/Al atom ratio of the second MFI zeolite can be adjusted to 60 or lower, for example, by controlling the composition of a starting material solution (including a Na source, a Si source, an Al source, an organic structure-directing agent, and water, for example) that is used in hydrothermal synthesis. Sodium hydroxide, sodium aluminate, sodium chloride, sodium fluoride, or the like can be used as a Na source, for example. Colloidal silica, fumed silica, tetraethoxysilane, sodium silicate, or the like can be used as a Si source, for example. Aluminum isopropoxide, aluminum hydroxide, sodium aluminate, alumina sol, or the like can be used as an Al source, for example. Tetrapropylammonium hydroxide, tetrapropylammonium bromide, tetrapropylammonium chloride, or the like can be used as an organic structure-directing agent, for example.

If the second MFI zeolite contains an organic structure-directing agent, it is preferable that the nitrogen-gas permeation speed of the second MFI zeolite membrane 45b before the organic structure-directing agent is burned off is 0.75 nmol/(m$^2$·s·Pa) or less. If the second MFI zeolite does not contain an organic structure-directing agent, it is preferable that the nitrogen-gas permeation speed of the second MFI zeolite membrane 45b after the second MFI zeolite membrane 45b is sufficiently exposed to saturated water vapor is 0.75 nmol/(m$^2$·s·Pa) or less. The nitrogen-gas permeation speed being 0.75 nmol/(m$^2$·s·Pa) or less means that the second MFI zeolite membrane 45b is formed in the form of a membrane.

Note that an organic structure-directing agent contained in the second MFI zeolite is burned off after formation of the second MFI zeolite membrane 45b.

Dehydration Method

A dehydration method according to the present invention is a method for selectively separating water from the mixture 11 containing water by making a pressure difference between opposite surfaces of the separation membrane 45.

Specifically, the mixture 11 is supplied to the space 4S on the supply side of the separation membrane 45 (specifically, the second zeolite membrane 45b) so that the mixture 11 comes into contact with one surface of the separation membrane 45, and thereafter the pressure in the space 4T on the permeation side of the separation membrane 45 (specifically, the first zeolite membrane 45a) is reduced, whereby water is selectively caused to permeate through the separation membrane 45 and is separated.

In the dehydration method according to the present invention, the separation membrane 45 that has high durability against water is used as the separation membrane, and therefore dehydration performance can be maintained over a long period of time.

Note that, if the mixture 11 is supplied in the form of a liquid, a pervaporation method can be used, and if the mixture 11 is supplied in the form of gas or supercritical gas, a vapor permeation method can be used.

If the pervaporation method is used, the pressure in the space 4S on the supply side of the separation membrane 45 is not particularly limited, but is preferably atmospheric pressure. The pressure in the space 4T on the permeation side of the separation membrane 45 is not particularly limited, but is preferably 8×10$^4$ Pa or less, more preferably 1×10$^{-2}$ to 5×10$^4$ Pa, and particularly preferably 1×10$^{-1}$ to 2×10$^4$ Pa. The temperature of the mixture 11 is not particularly limited, but is preferably 50° C. to 160° C., and more preferably 60° C. to 150° C. Thus, water can be separated from the mixture 11 at a low temperature, and therefore separation can be performed without using much energy. If the temperature of the mixture 11 is higher than 160° C., the energy cost may increase, and if the temperature is lower than 50° C., the separation speed may decrease.

If the vapor permeation method is used, the pressure in the space 4S on the supply side of the separation membrane 45 is not particularly limited, but is preferably 1×10$^5$ to 2.5×10$^7$ Pa, and a higher pressure is more preferable from the standpoint of the separation speed. If the pressure difference between the supply side space 4S and the permeation side space 4T is 2.5×10$^7$ Pa or more, the separation membrane 45 may be damaged or gas-tightness may be degraded. The pressure in the space 4T on the permeation side of the separation membrane 45 is only required to be lower than the pressure in the supply side space 4S, but is preferably 8×10$^4$ Pa or less, more preferably 1×10$^{-2}$ to 5×10$^4$ Pa, and particularly preferably 1×10$^{-1}$ to 2×10$^4$ Pa. The temperature of the mixture 11 is not particularly limited, but is preferably 50° C. or higher, more preferably 100° C. to 400° C., and particularly preferably 100° C. to 200° C., in terms of energy cost. If the temperature of the mixture 11 is lower than 50° C., the separation speed may decrease. If the temperature of the mixture 11 is higher than 400° C., the membrane may be degraded.

The water permeation flux of the separation membrane 45 at 50° C. is preferably 2 kg/(m$^2$·h) or more, more preferably 3 kg/(m$^2$·h) or more, and particularly preferably 5 kg/(m$^2$·h) or more, in terms of improving dehydration performance. The water permeation flux can be determined by supplying pure water heated to 50° C. to the space 4S on the supply side of the separation membrane 45, reducing the pressure in the space 4T on the permeation side of the separation membrane 45 to 50 Torr, and collecting water vapor permeated through the separation membrane 45.

OTHER EMBODIMENTS

In the above-described embodiment, the structure of the separation vessel 40 is described with reference to FIGS. 1 and 2, but the separation vessel is not limited to this structure. The separation vessel 40 is only required to have a structure that includes the housing portion 41, the separation membrane 45, and the porous support 44 and is configured to be capable of carrying out the above-described dehydration method.

In the above-described embodiment, the dehydration apparatus 100 includes, as one example of a "pressure changing apparatus", the pressure reducing apparatus 60 that reduces the pressure in the permeation side space 4T, but the dehydration apparatus 100 may include a pressure increasing apparatus that increases the pressure in the supply side space 4S, instead of or in addition to the pressure reducing apparatus 60.

In the above-described embodiment, the separation membrane 45 is formed into a tubular shape, but the separation membrane 45 may be formed into a polygonal tube-like shape, a flat plate-like shape, or the like in accordance with the shape of the porous support 44.

Figure 5:
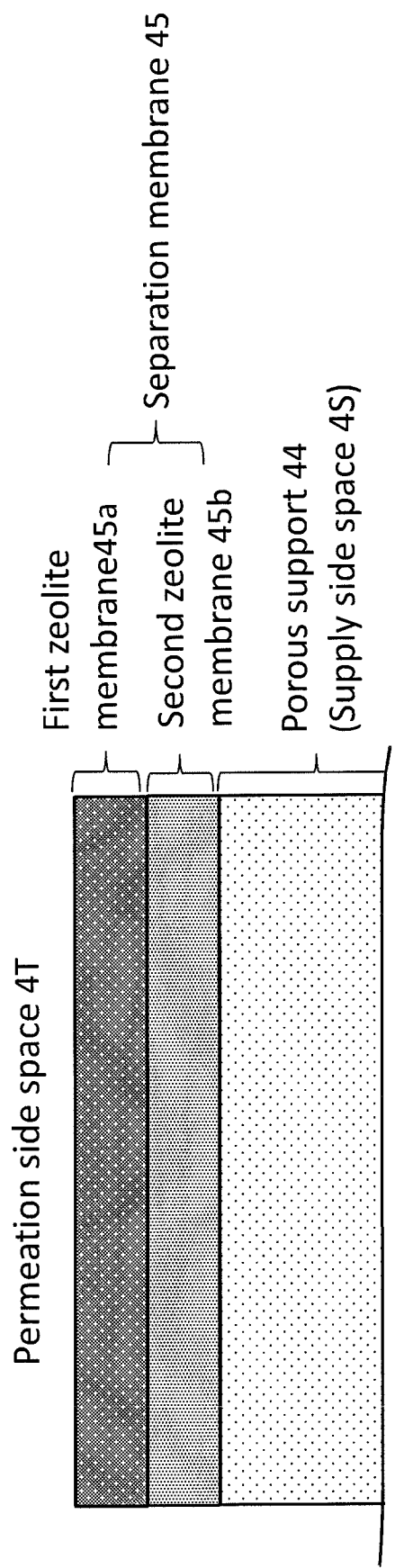
FIG. 5 is a cross-sectional view of a separation membrane.

As shown in FIG. 3, in the above-described embodiment, the separation membrane 45 is formed on the porous support 44 and includes the first zeolite membrane 45a that faces the permeation side space 4T and the second zeolite membrane 45b that is adjacent to the first zeolite membrane 45a and faces the supply side space 4S, but the separation membrane 45 is not limited to this configuration. For example, as shown in FIG. 5, the separation membrane 45 may include the first zeolite membrane 45a that is formed on the second zeolite membrane 45b and faces the permeation side space 4T and the second zeolite membrane 45b that is formed on the porous support 44 and faces the supply side space 4S. In the configuration of the separation membrane 45 shown in FIG. 5 as well, the first zeolite membrane 45a faces the permeation side space 4T, and the second zeolite membrane 45b faces the supply side space 4S and is adjacent to the first zeolite membrane 45a. In this case, the supply side space 4S includes not only the exterior space of the porous support 44 but also the interior space of the porous support 44.

Figure 6:
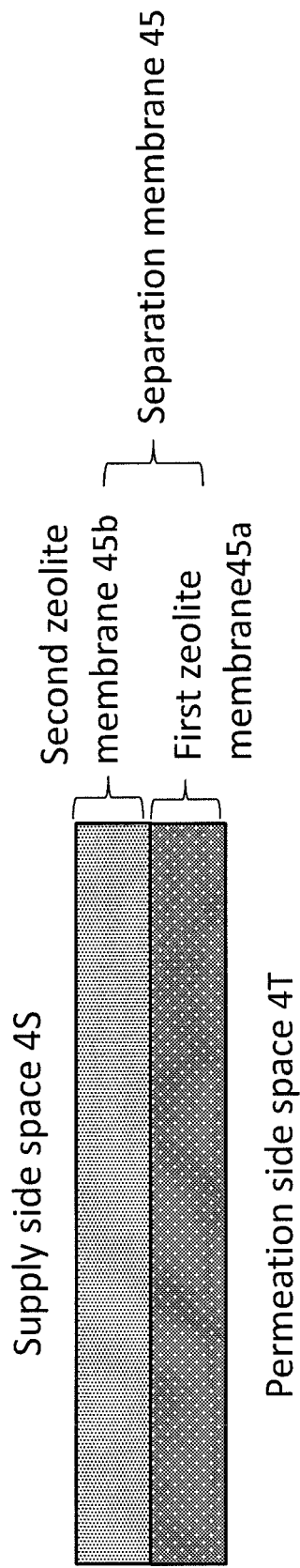
FIG. 6 is a cross-sectional view of a separation membrane.

As shown in FIG. 3, in the above-described embodiment, the separation membrane 45 is arranged on the porous support 44, but the separation membrane 45 is not limited to this configuration. For example, as shown in FIG. 6, the separation membrane 45 may be an independent membrane that is not supported by the porous support 44. In the configuration of the separation membrane 45 shown in FIG. 6 as well, the first zeolite membrane 45a faces the permeation side space 4T, and the second zeolite membrane 45b faces the supply side space 4S and is adjacent to the first zeolite membrane 45a.

In the above-described embodiment, the separation membrane 45 includes the first zeolite membrane 45a and the second zeolite membrane 45b, but the separation membrane 45 may further include a function membrane or a protective membrane, which is layered on the second zeolite membrane 45b. Such a function membrane or protective membrane is not limited to a zeolite membrane, and may be an inorganic membrane, such as a carbon membrane or a silica membrane, or an organic membrane, such as a polyimide membrane or a silicone membrane.

In the above-described embodiment, zeolites having an MFI structure as the framework structure are used as zeolites constituting the separation membrane 45, but a zeolite having a framework structure other than the MFI structure may also be used. The separation membrane 45 may be constituted by zeolites having only one type of framework structure or zeolites having different types of framework structure. If the separation membrane 45 is constituted by zeolites having different types of framework structure, the first zeolite and the second zeolite are only required to include at least one type of zeolite having the same framework structure.

The invention claimed is:

1. A dehydration apparatus comprising:
a separation vessel including a separation membrane that selectively separates water from a mixture containing water, and a housing portion that is sectioned by the separation membrane into a supply side space to which the mixture is supplied and a permeation side space to which water permeated through the separation membrane flows out; and
a pressure changing apparatus configured to increase the pressure in the supply side space and/or reduce the pressure in the permeation side space, wherein
the separation membrane includes a first zeolite membrane that faces the permeation side space, and a second zeolite membrane that faces the supply side space and is adjacent to the first zeolite membrane,
a first zeolite that constitutes the first zeolite membrane contains at least a silicon atom and an oxygen atom, and
a second zeolite that constitutes the second zeolite membrane has a framework structure that is the same as a framework structure of the first zeolite, the second zeolite has a lower Si/Al atom ratio than a Si/Al atom ratio of the first zeolite, and the second zeolite contains at least a silicon atom, an aluminum atom, an oxygen atom, and at least one type of atom selected from the group consisting of alkali metals, alkaline earth metals, and hydrogen;
wherein the framework structure of the first zeolite and the second zeolite is MFI.

2. The dehydration apparatus according to claim 1, wherein
the first zeolite is a high-silica zeolite, and
the second zeolite is a low-silica zeolite.

3. A dehydration method for selectively separating water from a mixture that contains water, using the dehydration apparatus according to claim 1, the method comprising:
a step of supplying the mixture to a supply side space of the separation membrane; and
a step of making a pressure difference between the supply side space and a permeation side space of the separation membrane, wherein
the separation membrane includes:
a first zeolite membrane configured to face the permeation side space and is constituted by a first zeolite; and
a second zeolite membrane configured to face the supply side space and is adjacent to the first zeolite membrane, and
the second zeolite membrane is constituted by a second zeolite that has a same framework structure as framework of the first zeolite and has a lower Si/Al atom ratio than a Si/Al atom ratio of the first zeolite.

4. The dehydration method according to claim 3, wherein
the first zeolite is a high-silica zeolite, and
the second zeolite is a low-silica zeolite.

5. The dehydration method according to claim 3, wherein the framework structure of the first zeolite and the second zeolite is any one of MFI, DDR, MEL, BEA, or CHA.

6. The dehydration method according to claim 3, wherein the framework structure of the first zeolite and the second zeolite is MFI or MEL.

* * * * *